US007990016B2

(12) United States Patent
Herbold

(10) Patent No.: US 7,990,016 B2
(45) Date of Patent: Aug. 2, 2011

(54) SLIP-RING MODULE FOR A ROTOR OF AN ELECTRIC MACHINE ELECTRIC MACHINE WITH A SLIP RING MODULE AND METHOD FOR PRODUCTION OF A SLIP RING MODULE

(75) Inventor: Klaus Herbold, Asperg (DE)

(73) Assignee: Robert Bosch GmbH, Stuttgart (DE)

( * ) Notice: Subject to any disclaimer, the term of this patent is extended or adjusted under 35 U.S.C. 154(b) by 341 days.

(21) Appl. No.: 11/911,823

(22) PCT Filed: May 4, 2006

(86) PCT No.: PCT/EP2006/062054
§ 371 (c)(1),
(2), (4) Date: Oct. 18, 2007

(87) PCT Pub. No.: WO2007/003454
PCT Pub. Date: Jan. 11, 2007

(65) Prior Publication Data
US 2008/0197744 A1   Aug. 21, 2008

(30) Foreign Application Priority Data
Jun. 30, 2005   (DE) .......................... 10 2005 031 535

(51) Int. Cl.
*H01R 39/08* (2006.01)
*H01R 39/04* (2006.01)
*H01R 39/32* (2006.01)
*H01R 39/00* (2006.01)
*H01R 39/06* (2006.01)
*H01R 43/10* (2006.01)
*H02K 15/02* (2006.01)

(52) U.S. Cl. ........ 310/232; 310/233; 310/234; 310/235; 310/236; 29/597; 29/598

(58) Field of Classification Search .......... 310/232–237; 29/597–598
See application file for complete search history.

(56) References Cited

FOREIGN PATENT DOCUMENTS
DE   3838436   5/1990
DE   10118004 A1 * 11/2001
(Continued)

OTHER PUBLICATIONS
Machine Translation DE 10225791 (2003) and DE 10316752 (2004) and DE 10118004 (2001).*
PCT/EP2006/062054 International Search Report.

*Primary Examiner* — Quyen Leung
*Assistant Examiner* — Jose A Gonzalez Quinones
(74) *Attorney, Agent, or Firm* — Michael Best & Friedrich LLP

(57) ABSTRACT

A slip ring module (76) for a rotor (40) of an electrical machine (10), in particular, an alternator is disclosed, comprising at least one first slip ring (79) with at least one first connecting conductor (103) held in sections of an insulation material (101) for the slip ring module (76), in electrically conducting connection with at least one first slip ring (79) and with an end (115) of the connection conductor (103), facing away from the first slip ring (79), provided for connection to an excitation coil (61). The invention is characterised in that the slip ring module (76) has a further formed conductor (139) forming a direct electrical connection from the first connection conductor (103) to a surface (142) of the slip ring module (76). An electric machine is also provided, in particular, an alternator for motor vehicles, comprising a rotor (40), supporting an excitation coil (61), said slip ring module (76) providing the power supply to the excitation coil (61). Furthermore, a method for production of a slip ring module (76) for an electric machine, in particular, an alternator, is disclosed, wherein, in one step, at least one connector conductor (103) is bonded to an electrically insulating holder (100), in particular, by means of a injection moulding process and, in another step, the connection conductor is directly connected to an electrically conductible conductor (139) made from a composite material, the composite material comprising electrically conducting and electrically non-conducting regions.

27 Claims, 8 Drawing Sheets

FOREIGN PATENT DOCUMENTS

| | | | |
|---|---|---|---|
| DE | 10225791 A1 * | 12/2003 | |
| DE | 10316752 A1 * | 10/2004 | |
| GB | 2282490 A * | 4/1995 | |
| JP | 47029207 U | 12/1972 | |
| JP | 57148560 A | 9/1982 | |
| JP | 05-292705 A | 11/1993 | |

* cited by examiner

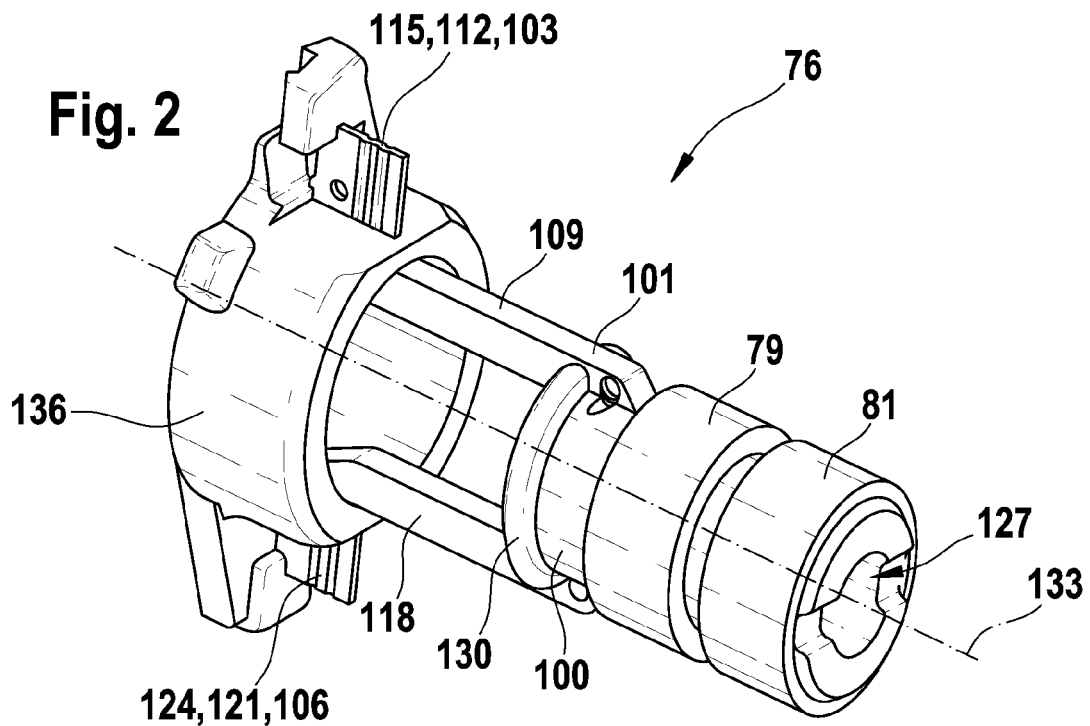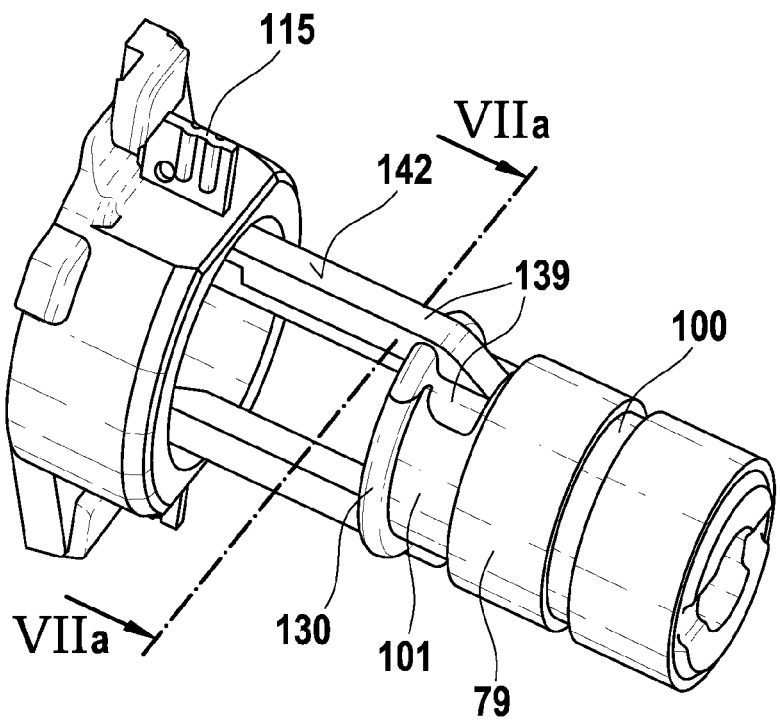

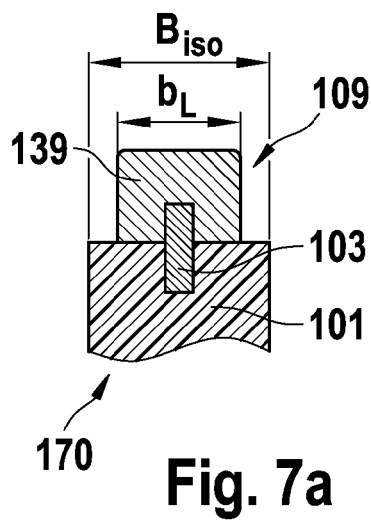
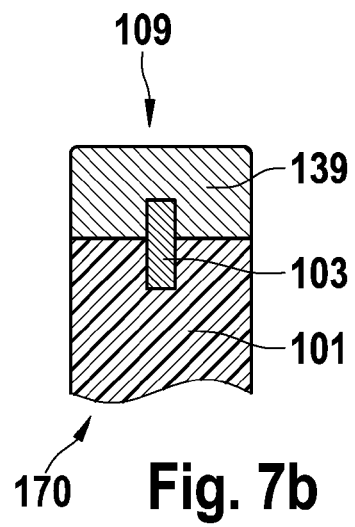
Fig. 7a    Fig. 7b
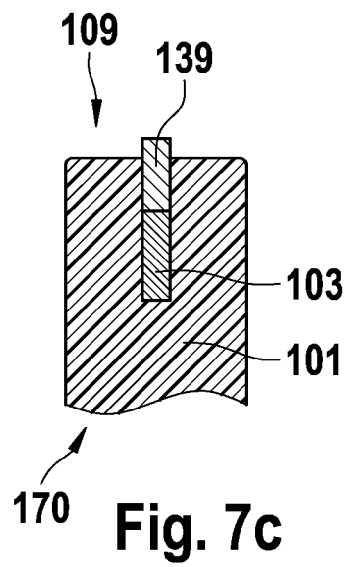
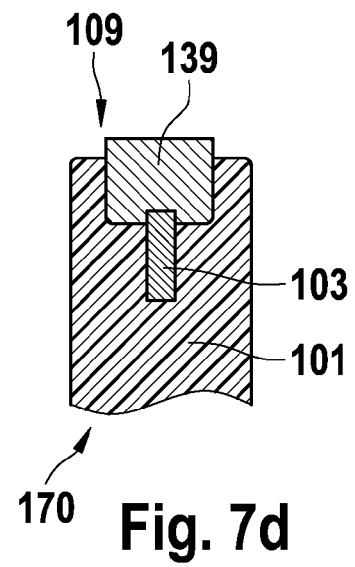
Fig. 7c    Fig. 7d
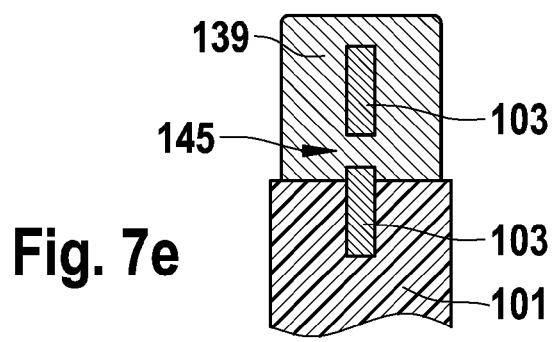
Fig. 7e

SLIP-RING MODULE FOR A ROTOR OF AN ELECTRIC MACHINE ELECTRIC MACHINE WITH A SLIP RING MODULE AND METHOD FOR PRODUCTION OF A SLIP RING MODULE

BACKGROUND OF THE INVENTION

The invention relates to a slip ring assembly for a rotor of an electric machine, an electric machine with a slip ring assembly, and a method for producing a slip ring assembly. Known slip ring assemblies of this type are normally comprised of two slip rings, which are supported by a holder made of insulating material. The two slip rings are each connected to an electrical connecting conductor, via whose ends one end can be fastened to an excitation coil of the rotor. One such slip ring assembly is known for example from Unexamined German Application DE 38 38 436 A1.

However, when using these and similar types of slip ring assemblies, previously unknown problems with rotary current generators, for which these types of slip ring assemblies are intended, have cropped up in connection with drive materials modified by vehicle manufacturers; in particular new materials for multi-V belts.

One phenomenon in this case is that, during rotational movement of the rotor, high electrostatic voltages build up, which discharge suddenly when an undefined limit is exceeded and which can thereby damage or even destroy the electronic components such as the regulator for the excitation coil. This voltage generation functions in accordance with the known "Van de Graaf generator."

Various efforts have already been made to solve this problem. Thus, Unexamined German Application DE 101 18 004 A1 discloses a system in which the electrostatic voltage is dissipated from the electromagnetic iron part via the negative slip ring to the electrical ground of the electric machine, for example, via a conductive coating of the holder made of insulating material. The disadvantage of the attainments disclosed there is that smooth functioning of the excitation coil after assembly and after connection to the slip ring assembly is no longer reliable or cannot even been tested anymore. The consequence of this is that rotors that are untested or untestable in this respect are not recognized under some circumstances as damaged, and therefore are processed further in the cost-intensive manufacturing process even though they are long since defective goods.

SUMMARY OF THE INVENTION

The advantage of the slip ring assembly in accordance is that because of the additional molded conductor, which forms a direct electrical connection from the first connecting conductor to a surface of the slip ring assembly, a high-voltage test of the excitation coil of the rotor can be conducted. This high-voltage test is used both during fabrication as well as after testing to check the winding for short circuits to the so-called rotor ground, i.e., to the magnetic parts of the rotor.

If one provides for the additional molded conductor to be positioned on the at least one first connecting conductor as a separate component, the advantage of the associated prefabrication is that a concrete precisely dimensioned component can be prefabricated that has no essential tolerance fluctuations, and therefore this separate component forms a reliable and precise electrical connection from the first connecting conductor to a surface of the slip ring assembly. If the additional molded conductor is embodied by molding on the at least one first connecting conductor, the spraying on of this additional molded conductor also permits the creation of an exact precise additional molded conductor that is high-quality and precise.

If the additional molded conductor has a material section, which forms an undercut and engages in an undercut of the connecting conductor, a secure radial position is achieved in particular in the embodiment as a separate component.

So that the additional molded conductor does not cause any short circuits of the excitation coil, it is envisaged that this additional molded conductor has a conductivity of 1E5 Ωcm to approx. 1E12 Ωcm. This makes sufficiently high currents to avoid the electrostatic discharge possible. At the same time, the effect on the excitation current is reasonably minimal.

If the additional molded conductor is arranged between the first slip ring and the end of the connecting conductor facing away from the first slip ring, it is thus possible in a mounted state to contact the molded conductor with an inner ring of a roller bearing, and thus dissipate the electrostatic charge from the magnetic parts via its shaft, the inner ring of the bearing, the molded conductor and connecting conductor. This arrangement takes into consideration the normal arrangements of compact generators (double-flow rotors) as disclosed in the prior art cited at the outset. If the first slip ring is arranged between the end of the connecting conductor facing away from the first slip ring and the additional molded conductor, then this arrangement corresponds to another variation of designs of compact generators, in which the slips rings are arranged between the supporting bearing or the roller bearing and the magnetic part of the rotor. In this case as well, dissipating the charge via the molded conductor on an inner ring of the roller bearing is possible.

If the additional molded conductor has a higher specific electric resistance than the connecting conductor, but a smaller specific electrical resistance than the insulating material, a clear path or route is produced for dissipating the electrostatic charge.

If a polymer composite material, which is preferably a mixture of polymer insulating material and conductive material, is selected as the material for the molded conductor, a molded conductor is obtained that can be manufactured using an injection molding process, and as a result it can be relatively freely designed in terms of its shape. As a result, it is quite possible in particular to adapt to local circumstances. In addition, there is the possibility of spraying this molded conductor on the insulating material of the slip ring assembly, which is comprised for example of similar materials, whereby a mechanical connection of the molded conductor to the embedded or adhering insulating material is quite possible. Slipping or detaching of the molded conductor before assembly on the electric machine is therefore ruled out.

If the molded conductor grips around the connecting conductor in an essentially U-shaped manner or the entire cross section of the connecting conductor, then an especially large-area connection of the molded conductor to the connecting conductor is obtained. A clamping in claws or frictionally engaged or positively engaged connection between the connecting conductor and the molded conductor is therefore quite possible. The molded conductor can therefore adhere especially well to the connecting conductor. Another embodiment of the invention provides for the first connecting conductor to be covered by the additional molded conductor in an axial section, and for the first connecting conductor to be at least partially surrounded there by insulating material of the slip ring assembly, wherein a width of the insulating material in the circumferential direction is greater than a width of the additional molded conductor in the circumferential direction. This measure makes specific cooperation with the electric machine possible. Because of the different widths, the angular position of the slip ring assembly is secured at the shaft end or on the rotor, on the one hand. The width of insulating material is responsible for this. As a result of the fact that the width of the additional molded conductor is smaller in the circumferential direction, however, than the width of the insulating material, contacting of the molded conductor in the circumferential direction in the area of the shaft or the rotor is ruled out. As a result, no electrical connection can be established to begin with between the additional molded conductor and the iron or magnetic parts of the rotor. This makes functional testing of the excitation winding possible after connecting said excitation winding to the slip ring assembly since the molded conductor is not able to cause a short circuit.

If the additional molded conductor defines, at its axial position and its angular position, a greater radius of the slip ring assembly with respect to an axis of the slip rings than said slip ring assembly has at another angular position of the same axial position, then a good electrical contact can be established between the metallic roller bearing inner ring and the molded conductor when said inner ring of the roller bearing is in a slid-on position.

In addition, an electric machine is envisaged that supports the slip ring assembly in accordance with the invention, and is used to supply power to the excitation coil and to dissipate the static electricity. Such a combination makes a reliable and very precisely reproducible dissipation of the static electricity possible. An especially space saving arrangement of the additional conductor is possible if the rotor has a shaft end on the slip ring side and the shaft end has a slot featuring slot walls, which slot extends in the axial direction and in which the at least one connecting conductor is arranged.

If the molded conductor contacts the shaft end only indirectly or if the current path goes from the first connecting conductor to the ground of the machine from the shaft and its essentially cylindrical outer side or a seat of the roller bearing on the inner ring of the roller bearing and from there to the additional molded conductor, then this arrangement makes the already mentioned testing of the excitation coil possible without the slid-on bearing.

A distance between the molded conductor and the slot walls makes indirect contacting of the molded conductor with the shaft end possible in an indirect manner.

In order to form an especially good contact between the roller bearing inner ring and the molded conductor, provisions are made for the mounted roller bearing to compress the molded conductor and for the resulting compression to enable an electric contact between the molded conductor and the roller bearing ring.

A method in accordance with the invention for producing a slip ring assembly envisages, in one step, that at least one connecting conductor is connected to an electrically insulating holder, in particular by means of an extrusion coating process, and, in another step, for this same connecting conductor to be directly connected to an electrically conductive conductor made of a composite material, wherein the composite material has electrically conductive and non-electrically conductive portions.

This method allows the dissipation of static electricity, which discharges via a narrowly delimited path. An especially compact design with simultaneous protection of the connecting conductor from corrosive attacks is produced if the connection is surrounded over a section in the direction of its longitudinal extension both, i.e., in the direction that is defined by the distance between the slip rings and the connections for the excitation winding, both by the electrically insulating holder as well as by the electrically conductive holder so that a common sheath is formed, wherein the insulating holder and the electrically conductive conductor complement one another to form the common sheath.

A particularly compact and reliable design of the slip ring assembly is produced if the electrically insulating holder is fabricated by extrusion coating of at least the one connecting conductor with subsequent solidification and preferably also the electrically conductive conductor, which is supposed to guarantee the electrostatic dissipation, is sprayed around surface sections of the connecting conductor.

It is envisaged that the electrically conductive conductor made of the composite material also be sprayed on the connecting conductor and that it preferably completely complement a recess of the insulating material, which was sprayed on the connecting conductor in a previous step. An overall impervious sheath is obtained and attacks from media that could lead to corrosion of the connecting conductor are practically impossible. Reliability is high.

BRIEF DESCRIPTION OF THE DRAWINGS

The drawings schematically depict exemplary embodiments of an inventive slip ring arrangement, an electric machine, as well as a method for producing a slip ring arrangement. The drawings show.

DETAILED DESCRIPTION

Figure 1:
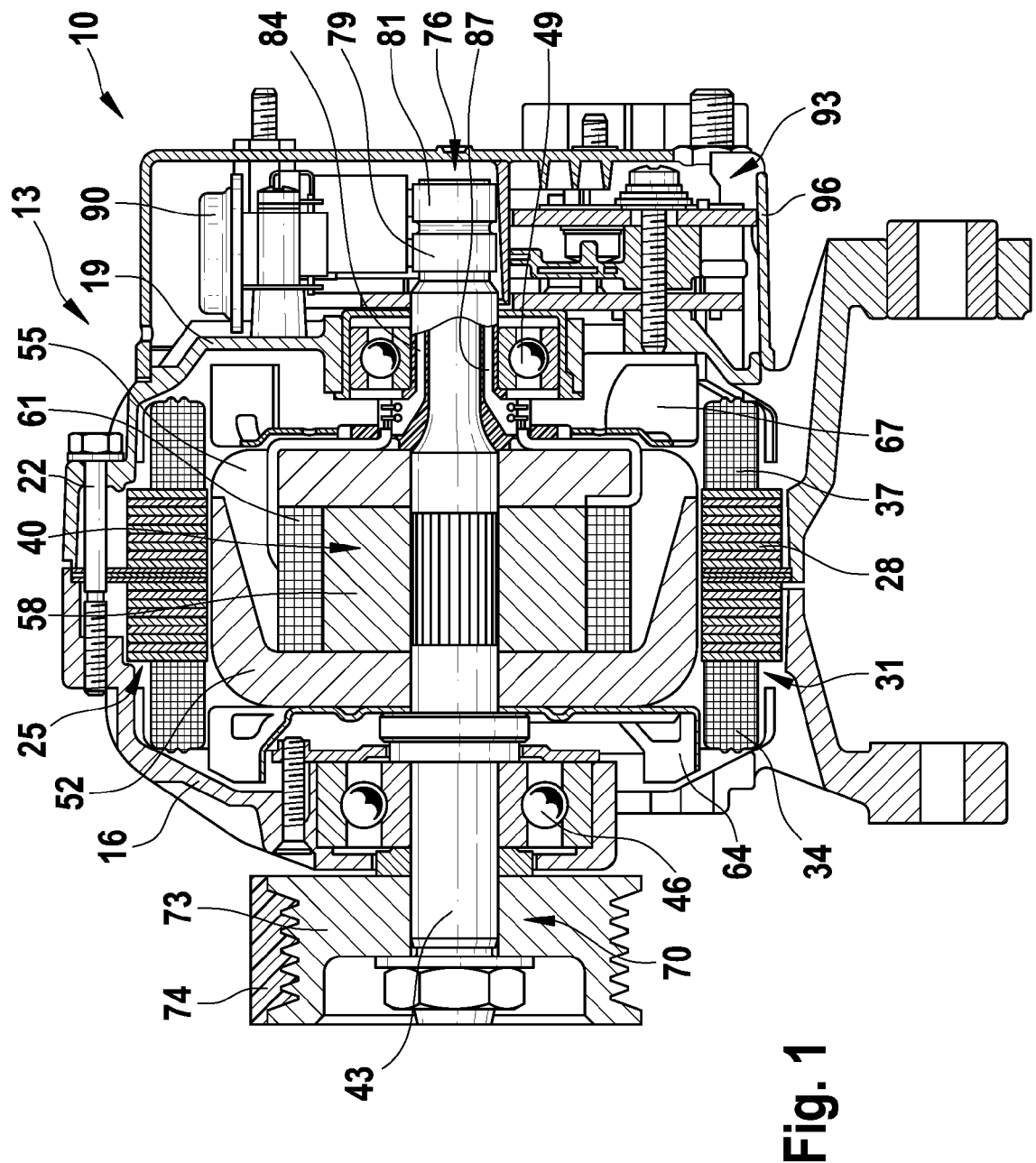
FIG. 1A rotary current generator of a type as previously used since the beginning of the 1990s, FIG. 2 A spatial view of a conventional slip ring assembly as it is used in a generator according to FIG. 1, FIG. 3 A spatial view of a slip ring assembly in accordance with the invention in a first exemplary embodiment, FIG. 4 The slip ring assembly after a first injection molding process.

FIG. 1 shows an electric machine 10, designed as a rotary current generator for motor vehicles. This electric machine 10 is comprised of a housing 13, which is embodied as two pieces. This housing 13 features a drive-side end shield 16 and a so-called brush-side end shield 19. A stator 25 is held between these two housing parts 16 and 19 by means of housing screws 22. This stator 25 is comprised of a stator core 28 into whose grooves (not shown here) a stator winder 31 is inserted. A drive-side winding head 34 and a brush-side winding head 37 of this stator winding 31 can be seen. A rotor 40 is arranged within the stator core 28. This rotor 40 is positioned via a shaft 43 both in the drive end shield 16 as well as in the brush-side end shield 19 by means of two bearings, namely a drive-side bearing 46 and a reverse bearing 49. The magnetic parts of the rotor 40 are positioned between the two bearings 46 and 49. A pole body 58 is positioned between a first magnet wheel half 52 and a second magnet wheel half 55. An excitation winding 61 is positioned around the pole bodies 58. The magnetic wheel half 52, the pole body 58, the excitation winding 61 and the magnet wheel half 55 are supported by the shaft 43. A first fan 64 is fastened on the side of the magnet wheel half 52 facing away from the excitation winding 61 and a second fan 67 is fastened on the corresponding counter side on the other magnet wheel half 55. Both fans are used to suction air from the axial direction and blow it through openings in the winding heads 34 and 37 and discharge it after warming through openings arranged on the radial outside (not shown here) to the environment.

A belt pulley 73 is fastened on the drive-side end 70 of the shaft 43 by means of a screw nut. This belt pulley is used to rotate the rotor by means of a belt 74. A slip ring assembly 76 is fastened on the brush-side end of the shaft 43. This slip ring assembly is used to energize the excitation winding 61 by means of two slip rings 79 (negative slip ring) and 81 (plus slip ring).

For this purpose, additional connecting elements are provided: a first connecting line 84 between the negative slip ring 79 and a second connecting line 87 as a connection between the positive slip ring 81 and the other end of the excitation winding 61. To energize the excitation winding 61, brushes (not designated in more detail here), which are loaded with excitation current by a regulator 90, glide on the cited slip rings 79 and 81. In addition, a normal rectifier 93 is present, which is covered with a protective cap 96.

FIG. 2 shows a spatial representation of a slip ring assembly 76 as it is used in the previously described generator. This slip ring assembly supports the already mentioned slip ring assemblies 79 and 81. Both slip rings 79 and 81 are held by a holder 100. The holder 100 is a complex entity, which is created by means of an injection molding process and is molded from an insulating material 101. This holder 100 bears two connecting conductors 103 and 106 concealed in its interior. The connecting conductor 103 connects the first slip ring 79 via a crosspiece 109 to a contact tag 112 embodied to be a single piece with the connecting conductor 103 and represents an end 115 facing away from the first slip ring 79. The connecting conductor 106 connects the second slip ring 81 via the crosspiece 118 to a contact tag 121 that is also embodied to be a single piece and also represents an end 124 of the connecting conductor 106 facing away from the slip ring 81. The connecting conductor 106 just like the connecting conductor 103 is arranged within the holder 100. The connecting conductor 106 passes through the slip ring 79. The slip rings 79 and 81 form an outer delimitation for the holder 100. Provided radially within the slip rings 79 and 81 is an opening 127, which is embodied hollow cylindrically. Later in a mounted state, this opening 127 is occupied by a shaft-side pin. This basically hollow cylindrical section between the end-side opening 127 and the transition of the holder 100 to the two crosspieces 109 and 118 is delimited by a protuberance 130, which is positioned approximately annularly around the rotational axis 133. A ring section 136 is adjacent to the end of the crosspiece 109 or 118 facing away from the protuberance 130, and said ring section stabilizes the position of the ends 115 in that these ends 115 and 124 or sections of this connecting conductor 103 or 106 are embedded in this ring section 136.

The holder 100 includes both the portion of the holder part 100 that is arranged within the slip rings 79 and 81 as well as the area around the protuberance 130, the insulation of the crosspieces 109 and 118 and the ring section 136.

It is easy to see that the slip ring assembly shown in FIG. 3 is very similar to the slip ring assembly depicted in FIG. 2. The difference is the different designs of the crosspiece 109, a section of the protuberance 130 and a portion of the remaining holder 100.

Thus, large parts of the holder 100 and its insulation of the crosspieces 118 and 109 are composed of the insulating material 101. The crosspiece 109 with the adjacent area of the protuberance 130 and a small section of the annular cylindrical area of the holder 100 is replaced with another material. According to this exemplary embodiment, this material is also an injection moldable material, which is designated here as a polymer composite material. This polymer composite material is a mixture of a polymer insulating material, such as PA 66, and a conductive material, e.g., graphite or metal components that were originally present in form of a powder. In this case, this material forms a molded conductor 139, which forms a direct electrical connection from the first connecting conductor 103 embedded in the crosspiece 109 to a surface 142 of the slip ring assembly 76. The surface 142 in this exemplary embodiment is formed by the molded conductor 139 or the material partially injected around the connecting conductor 103. "Molded" conductor 139 means that the shape of the conductor 139 as a whole originates from the use of a mold, and its surface shape or contour is produced by the contour-generating manufacturing mold.

As a result, a slip ring assembly 76 for a rotor 40 of an electric machine 10, in particular a rotary current generator, is provided, wherein this slip ring assembly 76 has at least one first slip ring 79. At least one first connecting conductor 103 is held, preferably embedded, in sections in the insulating material 101 of the slip ring assembly 76 and said connecting conductor is electrically conductively connected to the at least one first slip ring 79. This first connecting conductor 103 has an end 115 facing away from the first slip ring 79, which is provided for an electrical connection to an excitation coil 61. The slip ring of the component 76 has another molded conductor 139, which forms a direct electrical connection from the first connecting conductor 103 to a surface 142 of the slip ring assembly 76.

It is envisaged that the additional molded conductor 139 be sprayed on the at least one connecting conductor 103 via an injection molding process and therefore be molded on said connecting conductor 103. The molded conductor should generally have, i.e., not just for this exemplary embodiment, a conductivity of 1E5 Ωcm to 1E12 Ωcm. This conductivity relates in this case to the material strength, which relates to between the connecting conductor 103 and the surface 142. It is envisaged for the smooth functioning of the molded conductor 139 that said conductor have a higher specific electrical resistance than the connecting conductor 103, but a smaller specific electric resistance than the insulating material 101. The connecting conductor 103 in this case is the connecting conductor, which is surrounded by the molded conductor 139 at least in sections.

The additional molded conductor 139 is arranged between the first slip ring 79 and the end 115 of the connecting conductor 103 facing away from the first slip ring 79. This position of the molded conductor 139 is situated preferably at a position provided for the seat of the bearing 49.

Figure 4:
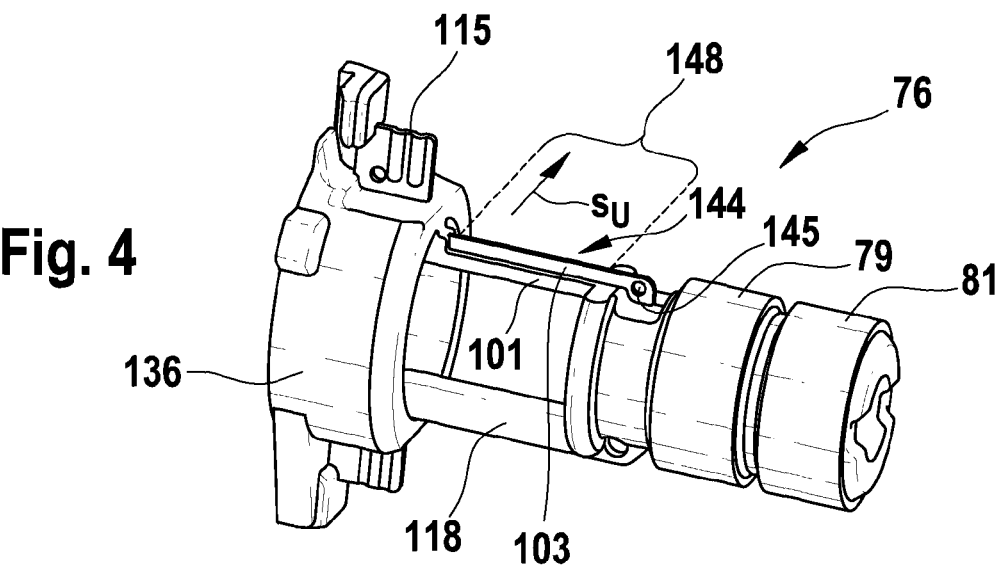

FIG. 4 shows the slip ring assembly 76 before its completion. As already mentioned, the slip ring assembly 76 in accordance with a first exemplary embodiment is supposed to be manufactured by two injection molding process steps. Thus, a first process step whose result is depicted in FIG. 4 provides that the two slip rings 79 and 81 as well as the connecting conductors 103 and 106 attached or electrically connected to the two slip rings are partially extrusion coated with the insulating material 101 in such way that the outer sides of the slip rings 79 and 81 are left exposed, the inner sides of slip rings are covered with insulating material 101 and the connecting crosspiece 118 is completely sheathed in insulating material 101. In addition, the ring section 136 is also cast on in this process step. In the case of the crosspiece 109, the status after this first process step is such that the connecting conductor 103 in this case is free to the radial outside and therefore not covered with insulating material 101 at this location. A recess 148 is thus left free. This figure also shows that the connecting conductor 103 has an opening 145, which will later fulfill a function.

Figure 5:
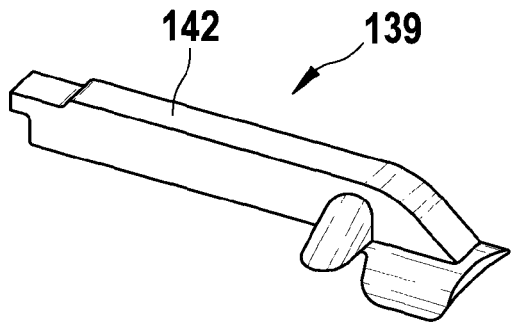
FIG. 5 The molded conductor independent of the slip ring assembly.

The molded conductor 139 by itself can be seen in FIG. 5. This section complements the arrangement from FIG. 4 in an injection molding mold such that the slip ring assembly according to FIG. 3 is produced.

As indicated in FIG. 4, the first connecting conductor 103 is covered by the additional molded conductor 139 in an axial section 148. The connecting conductor 103 in this case is also at least partially surrounded by insulating material 101 of the slip ring assembly 76 as is evident in FIG. 4. It is envisaged in this case that a width $B_{iso}$ of the insulating material 101 in the circumferential direction su is greater than a width $b_L$ of the additional molded conductor 139 in the circumferential direction su; also see FIGS. 6 and 7a.

FIGS. 7a through 7e depict various embodiments of a crosspiece 109. Thus, FIG. 7a shows the preferred embodiment as depicted in accordance with the section diagramed in FIG. 3. Clear to see in this case is the connecting conductor 103 that is embedded in the insulating material 101, which is freely accessible on its upper side after the first injection process. After this first injection process, the molded conductor 139 is sprayed on, in this case in such a way that the additional molded conductor 139 essentially grips around the connecting conductor 103 in a U-shaped manner. The exemplary embodiment in accordance with FIG. 7b shows a molded conductor 139, which is just as wide as the insulating material 101 or the non-conductive insulation of the crosspiece 109. FIG. 7c depicts a connecting conductor 103, which is covered by a molded conductor 139, whose width is just as great as that of the connecting conductor 103. The molded conductor 139 in FIG. 7d is wider than the connecting conductor 103. FIG. 7e shows a connecting conductor 103 with an opening 145 forming an undercut. The additional molded conductor 139 grips behind this opening 145 or the undercut with a section of its material so that as a result the additional molded conductor 139 is secured in its position to the radial outside.

Figure 8:
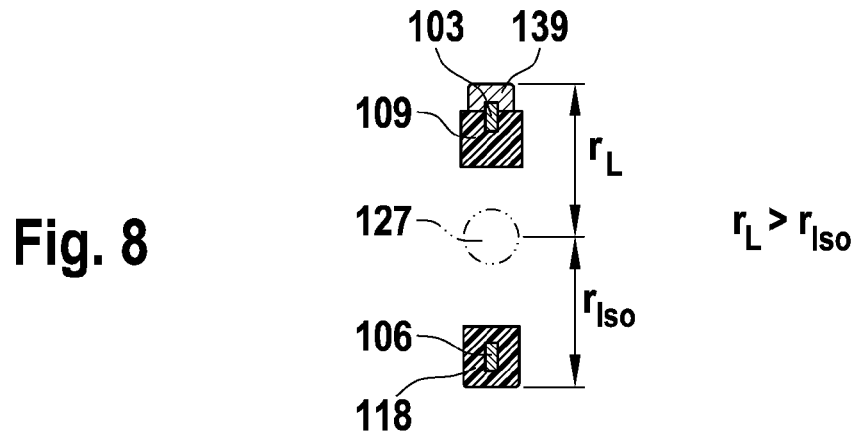

If one observes the slip ring assembly 76 in a section through the two crosspieces 118 or 109, (see FIG. 8), then one will recognize with reference to the described opening 127, whose longitudinal axis covers itself with a rotational axis of the rotor 40, that the outer radii of the crosspieces are different. In this concrete case, this means that the outer radius $r_{Iso}$, of the crosspiece 118, i.e., of the crosspiece that does not support the molded conductor 139, is smaller than radius $r_L$ of the molded conductor 139. This means that the additional molded conductor 139 defines, at its axial position and its angular position, a greater radius $r_L$ of the slip ring assembly 76 than said slip ring assembly has at another angular position (here in this case at the position of crosspiece 118) of the same axial position.

Figure 9:
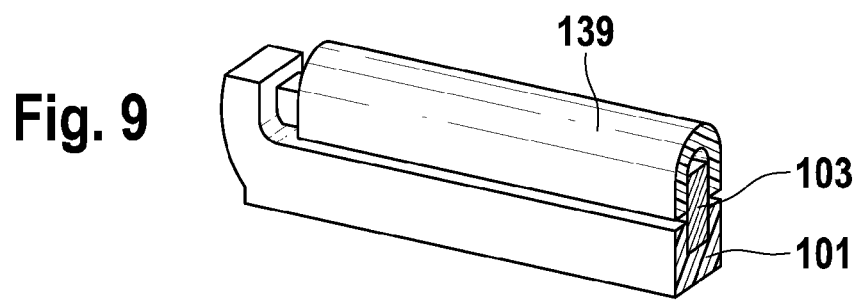

FIG. 9 shows another exemplary embodiment of a molded conductor 139. Thus, it is envisaged for example, as an alternative to a molded conductor 139 sprayed on the holder 100, to use an otherwise pre-molded conductor 139. This pre-molded conductor 139 can be placed for example on the first connecting conductor 103 of the semi-finished slip ring assembly 76, as indicated in FIG. 4. This type of pre-molded conductor 139 can of course also be designed as described in FIGS. 7a to 7d. In addition, this pre-molded conductor 139 could also be pre-molded in such a way that projections on this conductor 139 could engage in an undercut or an opening 145 (attainment according to FIG. 7e). But even the conditions that are formulated in the description regarding FIG. 8 can of course also be fulfilled by a pre-molded conductor 139.

Figure 10:
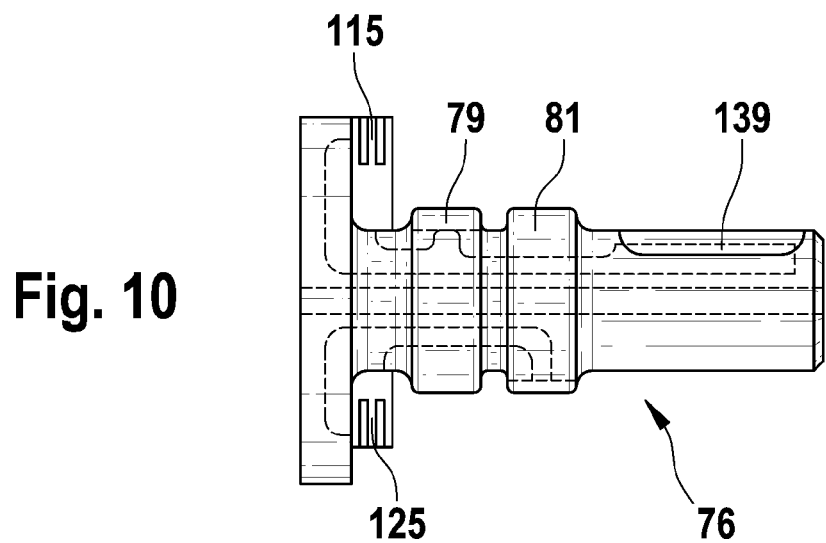

FIG. 10 depicts another exemplary embodiment of a slip ring assembly 76. In contrast to the previously depicted embodiments, in this case the position of the slip rings is switched with the position of the molded conductor 139. This embodiment takes designs for electric machines into account, particularly rotary current generators, whose roller bearing 49 is not arranged near to the magnetic parts of the rotor 40, but at a more distant or the most distant end of the shaft 43.

Figure 11:
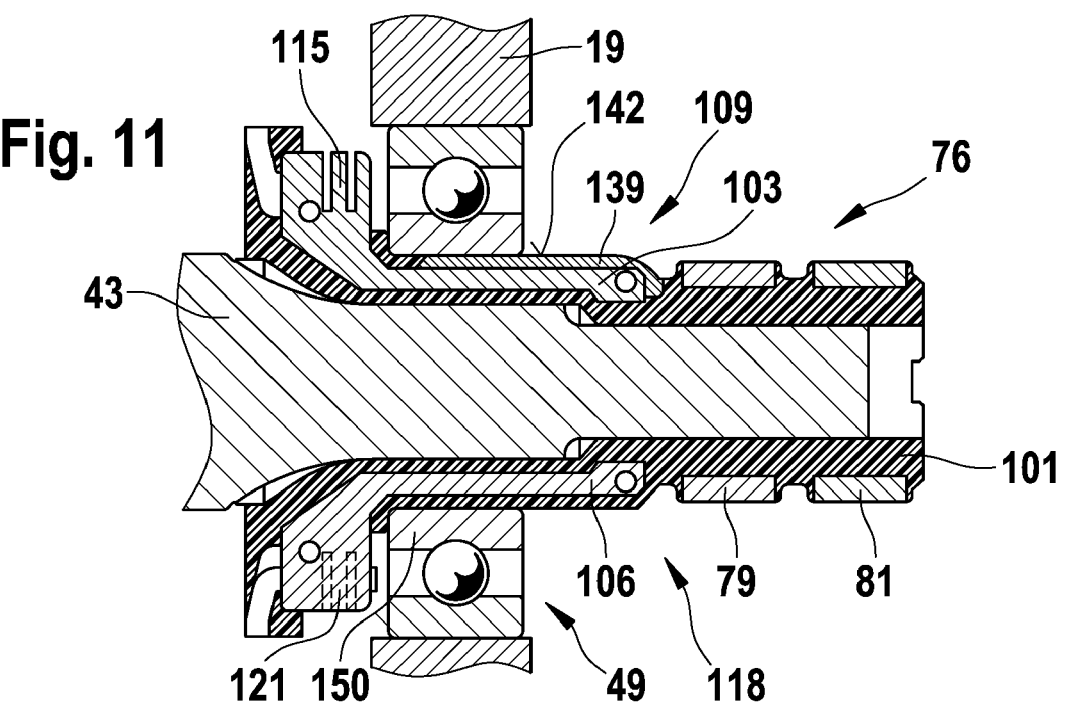
FIG. 11 A longitudinal section through the mounted slip ring assembly.

FIG. 11 shows a longitudinal section through the slip ring assembly 76. In addition, in this case the bearing 49 is mounted on the slip ring assembly 76. The slip ring assembly 76, and especially the molded conductor 139 are dimensioned in such a way (also see FIG. 8) that a roller bearing 49 mounted on the slip ring assembly 76 compresses the molded conductor 139 in the radial direction. This produces a good quality electrical contact point between the molded conductor 139 and a roller bearing ring 150.

Figure 12:
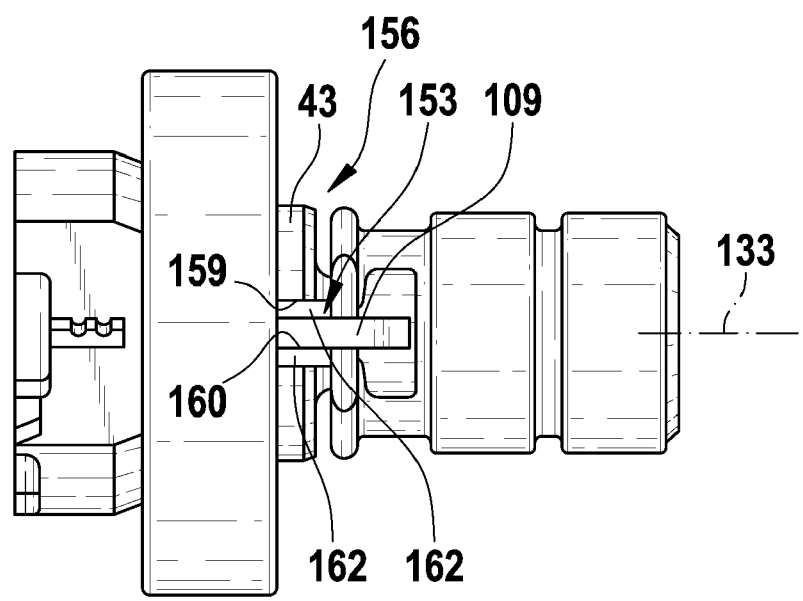
FIG. 12 A top view of the mounted slip ring assembly and a mounted roller bearing, FIG. 13 A spatial representation of a portion of the connecting conductor with a molded conductor for another exemplary embodiment of a slip ring assembly, FIG. 14 A cross section through the connecting conductor and the molded conductor from FIG. 13, FIG. 15 A slip ring assembly with the connecting conductor and the molded conductor according to FIG. 13, FIG. 16 A cross section through the special crosspiece of the slip ring assembly from FIG. 15, FIG. 17 A schematic representation of an electric machine with a rotor.

FIG. 12 shows a top view of the molded conductor 139. The molded conductor sits with its crosspiece 109 in a slot 153 extending in the axial direction of the shaft 43. This slot 153 in the shaft end 156 has slot walls 159 and 160, which are arranged parallel to one another and opposite from one another. The connecting conductor 103 arranged in the crosspiece 109 is arranged in the slot 153.

Figure 13:
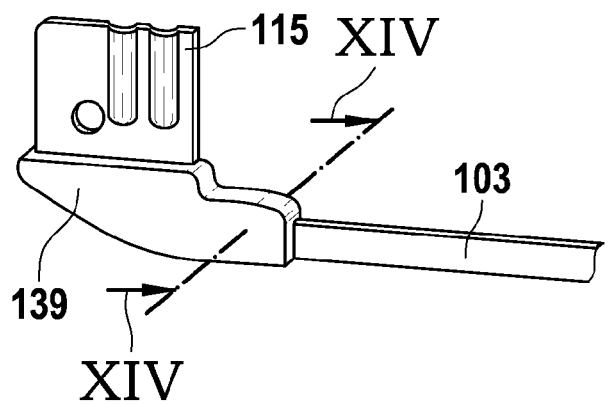
Figure 14:
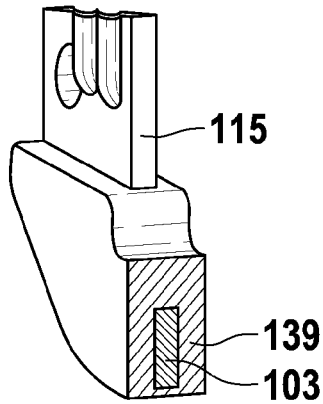

FIG. 13 shows a spatial representation of a portion of the connecting conductor 103 with a molded conductor 139 for another exemplary embodiment of a slip ring assembly 76, which has far-reaching commonality with the other exemplary embodiments. The connecting conductor 103 has an angular shape so that the section of the connecting conductor 103 arranged in the crosspiece 109 and the end section 115 enclose an angle. At this angular or "knee" point, the connecting conductor 103 is sheathed in a mold by the molded conductor 139 in a first extrusion coating process. The molded conductor 139 grips around the connecting conductor 103, in this case around its entire cross section. This sheathing of the connecting conductor 103 by the conductive material is easy to see in FIG. 14 in a cross section though the connecting conductor 103 and the molded conductor 139.

Figure 15:
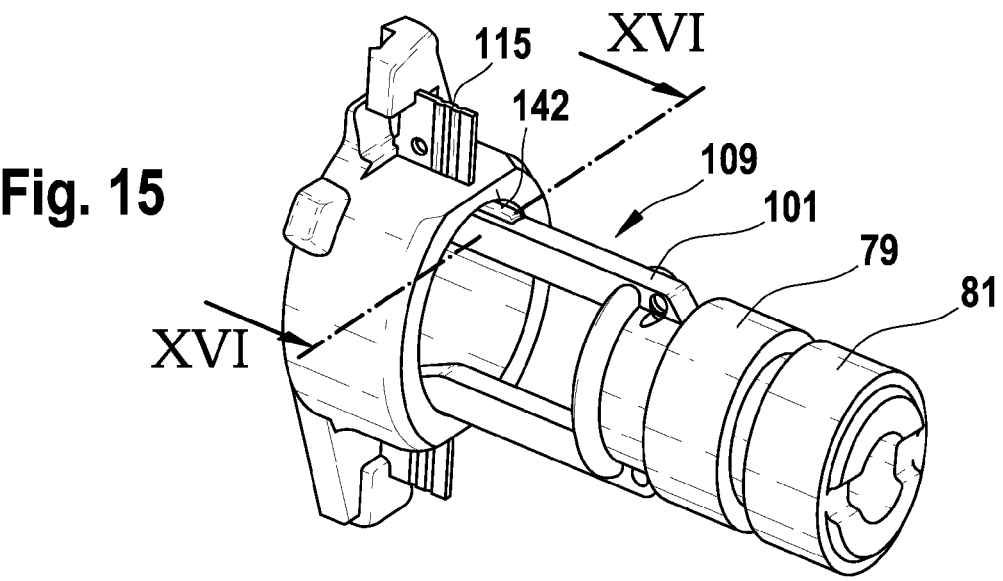

According to the slip ring assembly 76 depicted in FIG. 15, it is envisaged that the molded conductor 139 appear in the area of the crosspiece 109 so that as with the preceding exemplary embodiments (also see FIG. 11) an inner ring 150 of a positioned roller bearing 49 can contact the molded conductor 139. In this case, similar to the depiction of FIG.

Figure 16:
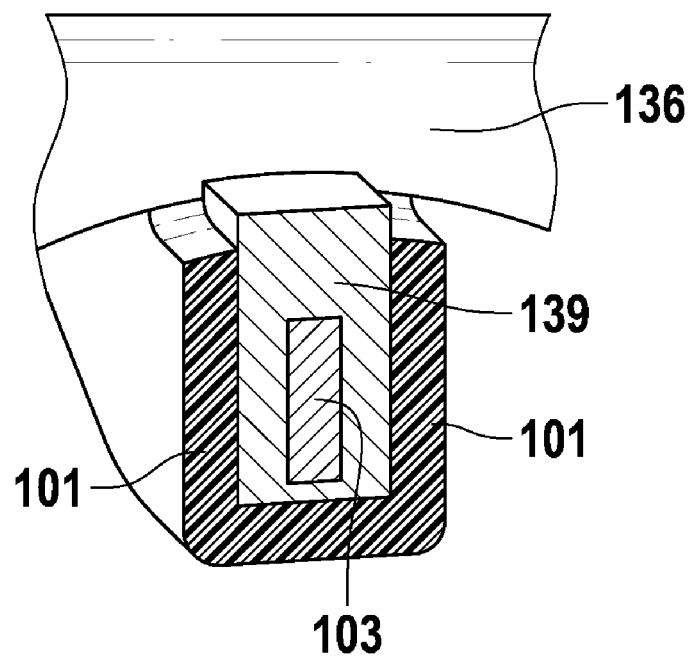

7d, the insulating material 101 forms a contact obstacle to the shaft 43. In this regard also see FIG. 16 with a cross-sectional depiction through the special crosspiece 109 of the slip ring assembly 76 from FIG. 15. This molded conductor 139 could also directly contact the shaft 43 in an alternative exemplary embodiment.

As already mentioned with respect to the previously discussed exemplary embodiments, the molded conductor 139 could also be molded separately from the connecting conductor 103. Such a preform can then for example be placed or mounted around the connecting conductor 103. Then a holder 100 could be sprayed around this molded conductor 139 in a molding process.

Figure 17:
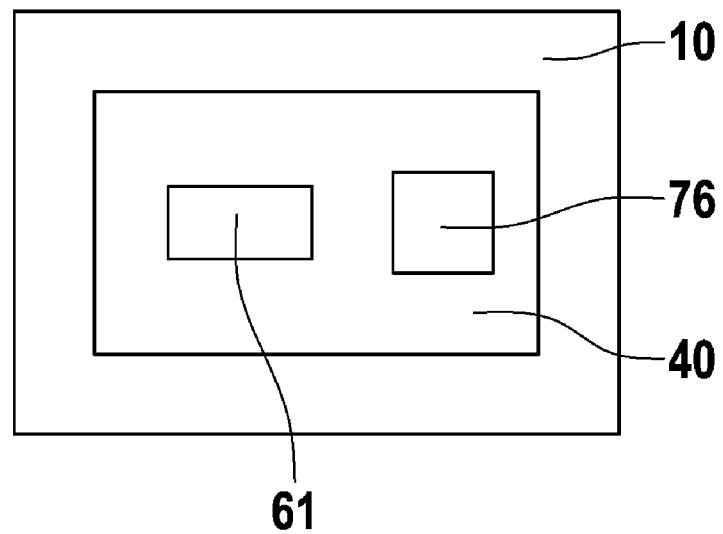

FIG. 17 shows a schematic representation of an electric machine 10 with a rotor 40. The rotor 40 supports a slip ring assembly 76, which energizes the excitation winding 61.

Figure 6:
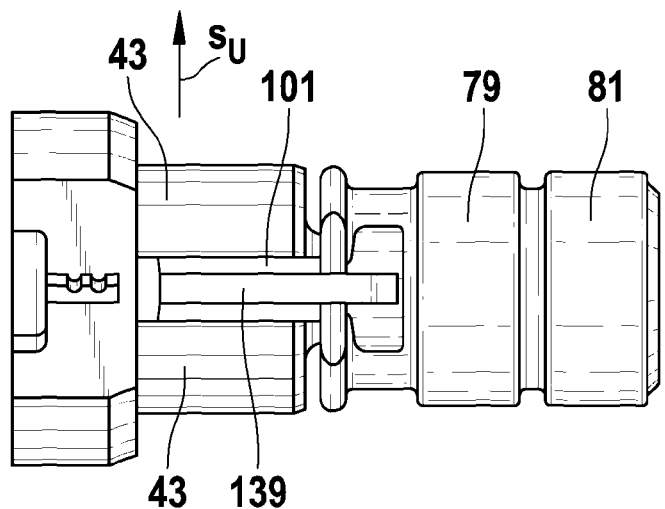
FIG. 6 The slip ring assembly in a state mounted on the shaft whereby the molded conductor is shown in a top view, FIG. 7 Various possible cross-sectional shapes of a crosspiece with an additional conductor molded or positioned thereon, FIG. 8 A cross section through two connecting conductors of the slip ring assembly, FIG. 9 Another exemplary embodiment of a molded conductor, FIG. 10 Another exemplary embodiment of a slip ring assembly, whereby in this case the slip rings are arranged between the molded conductor and one end of the connecting line facing away from the first slip ring.

As already explained in connection with FIGS. 6 and 7a, the molded conductor 139 in a particular embodiment has a lower width in the circumferential direction than the insulating material or than the crosspiece width $B_{Iso}$. Because the radially internally oriented side or inner cylindrical surface of the inner ring 150 of the bearing 49 contacts the shaft 53, the electrostatic charge can be transmitted from the shaft 43 to the inner ring 150. From there the current flows from the inner ring to the molded conductor 139 and from there, in turn, to the connecting conductor 103, which is connected to the slip ring 79. It is clear, as a result, that the shaft end 43 supporting the roller bearing 49 is an electrical connection between the molded conductor 139 and the slip ring 79. The slip ring 79 is in turn connected via its brushes and the regulator to the ambient ground so that the electrostatic electricity can be dissipated thusly. It follows from this that the molded conductor 139 contacts the shaft end 43 only indirectly. As FIG. 12 shows, there is a distance 162 or 163 between the molded conductor 139 and the slot walls 159 and 160.

The production process will be described in the following. As described previously, for example with regard to FIG. 4, in one step, at least one connecting conductor 103 is connected to the electrically insulating holder 100. This connection step is preferably conducted by an extrusion coating process in a closed casting mold. According to a preferred embodiment, in another step, the same connecting conductor 103 is connected directly to an electrically conductive conductor 139 made of a composite material. The composite material in this case has electrically conductive and non-electrically conductive portions. In this case it is not important whether the molded conductor 139 is first sprayed on the connecting conductor 103 or after extrusion coating of the holder 100.

Alternatively, provisions can also be made for the semi-finished part of the connecting conductor 103 with the slip ring 79 or the connecting conductor 106 with slip ring 81 to be inserted into in an already pre-fabricated holder 100.

As depicted in FIGS. 7a through 7e in connection with FIG. 4, it is envisaged that the connecting conductor 103 be surrounded over section 148 in the direction of its longitudinal extension, i.e., in the direction in which the two slip rings 79 and 81 are spaced apart, by both the electrically insulating holder 100 as well as by the electrically insulating conductor 139 made of the composite material. A common sheath is formed in the process, wherein the insulating holder 100 and the electrically conductive conductor 139 complement one another to form the common sheath 170, see FIG. 7. The electrically conductive conductor 139 is preferably sprayed around a surface section of the connecting conductor 103.

The variation presented in FIG. 9 envisages that the electrically conductive conductor 139 be prefabricated from the composite material and is added as such a component to the connecting conductor 103.

According to the preferred embodiment, it is envisaged that the electrically insulating holder 100 be fabricated by extrusion coating of at least the one connecting conductor 103 and subsequent solidification. On its outer side the holder 100 supports at least one slip ring 79, which electrically contacts the connecting conductor 103. According to the depiction in FIG. 4, when spraying on the holder 100, a longitudinal section 148 of the connecting conductor 103 is left free of insulating material 101 (formation of a recess) and an end section of the connecting conductor 103 also remains free and is used for connecting to an excitation winding 61. In this case, the electrically conductive conductor 139 is sprayed on the connecting conductor 103 preferably from the already mentioned composite material and in the process preferably completely complements a recess 144 of the insulating material 101.

In the case that testing the excitation coil 61 after assembly on the rotor 40 is considered unnecessary, providing the molded conductor 139 as a complete sheath around the connecting conductor 103 is also envisaged. The molded conductor 139 can also be arranged merely on the inner side of the conductor 103 and thus be a direct connection in the slot 153.

The molded conductor 139 should represent a resistance of 10 kΩ to 10 MΩ between the shaft 43 and the slip ring 79. Functioning is assured within these limits: on the one hand, enough charge per time unit is bled off so that no static voltages can build up, on the other hand, the resistance is great enough to make smooth functioning of the excitation winding 61 possible.

The invention claimed is:

1. Slip ring assembly (76) for a rotor (40) of an electric machine (10), comprising at least one first slip ring (79), wherein at least one first connecting conductor (103) is held in sections in an insulating material (101) of the slip ring assembly (76), in an electrically conductive connection with the at least one first slip ring (79), and with one end (115) of the connecting conductor (103) facing away from the first slip ring (79), provided for an electrical connection to an excitation coil (61), characterized in that the slip ring assembly (76) has an additional molded conductor (139), which forms a direct electrical connection from the first connecting conductor (103) to a surface (142) of the slip ring assembly (76).

2. Slip ring assembly according to claim 1, characterized in that the additional molded conductor (139) is positioned on the at least one first connecting conductor (103) as a separate component.

3. Slip ring assembly according to claim 1, characterized in that the additional molded conductor (139) is molded on the at least one first connecting conductor (103).

4. Slip ring assembly according to claim 1, characterized in that the slip ring assembly (76) has a rotational axis (133) and the additional molded conductor (139) grips behind an undercut (145) of the connecting conductor (103) with a section of its material and thereby secures the additional molded conductor (139) in its position to the radial outside.

5. Slip ring assembly according to claim 1, characterized in that the additional molded conductor (139) has a conductivity of 1E5 cm to 1E12 cm.

6. Slip ring assembly according to claim 1, characterized in that the additional molded conductor (139) is arranged between the first slip ring (79) and the end (115) of the connecting conductor (103) facing away from the first slip ring (79).

7. Slip ring assembly according to claim 1, characterized in that the first slip ring (79) is arranged between the end (115) of the connecting conductor (103) facing away from the first slip ring (79) and the additional molded conductor (139).

8. Slip ring assembly according to claim 1, characterized in that the additional molded conductor (139) has a higher specific electrical resistance than the connecting conductor (103), but a smaller specific electrical resistance than the insulating material (101).

9. Slip ring assembly according to claim 1, characterized in that the additional molded conductor (139) is comprised of a conductive polymer composite material.

10. Slip ring assembly according to claim 1, characterized in that the additional molded conductor (139) grips around the connecting conductor (103) in an essentially U-shaped manner or the entire cross section of the connecting conductor (103).

11. Slip ring assembly according to claim 1, characterized in that the first connecting conductor (103) is covered by the additional molded conductor (139) in an axial section (148) and the first connecting conductor (103) is at least partially surrounded there by insulating material (101) of the slip ring assembly (76), wherein a width of the insulating material (101) in the circumferential direction ($s_U$) is greater than a width of the additional molded conductor (139) in the circumferential direction ($s_U$).

12. Slip ring assembly according to claim 1, characterized in that the additional molded conductor (139) defines, at its axial position and its angular position, a greater radius ($R_L$) of the slip ring assembly (76) than said slip ring assembly has at another angular position of the same axial position (148).

13. Electric machine with a rotor (40), which supports an excitation coil (61), wherein a slip ring assembly (76) is used to supply power to the excitation coil (61), the slip ring assembly comprising at least one first slip ring (79), wherein at least one first connecting conductor (103) is held in sections in an insulating material (101) of the slip ring assembly (76), in an electrically conductive connection with the at least one first slip ring (79), and with one end (115) of the connecting conductor (103) facing away from the first slip ring (79), provided for an electrical connection to the excitation coil (61), characterized in that the slip ring assembly (76) has an additional molded conductor (139), which forms a direct electrical connection from the first connecting conductor (103) to a surface (142) of the slip ring assembly (76).

14. Electric machine according to claim 13, characterized in that the rotor (40) has a shaft end (43) on the slip ring side and that the shaft end (43) has a slot (153) featuring slot walls (159, 160), which slot extends in the axial direction, wherein the at least one connecting conductor (103) is arranged in the slot (153).

15. Electric machine according to claim 13, characterized in that the molded conductor (139) contacts the shaft end (43) only indirectly.

16. Electric machine according to claim 13, characterized in that there is a distance (162) between the molded conductor (139) and the slot walls (159, 160).

17. Electric machine according to claim 13, characterized in that a roller bearing (49) supporting the shaft end (43) is an electric connection between the magnetic parts of the rotor (40) and the molded conductor (139).

18. Electric machine according to claim 13, characterized in that the roller bearing (49) compresses the molded conductor (139) and thereby serves to form a good electrical contact point between the molded conductor (139) and a roller bearing ring (150).

19. Method to produce a slip ring assembly (76) for an electric machine, wherein, in one step, at least one connecting conductor (103) is mechanically connected to an electrically insulating holder (100) that does not conduct electricity from the connecting conductor, and, in another step, the connecting conductor is directly electrically connected to an electrically conductive conductor (139) made of a composite material, wherein the composite material has electrically conductive and non-electrically conductive portions.

20. Method according to claim 19, characterized in that the connecting conductor (103) is surrounded over a section in the direction of its longitudinal extension both by the electrically insulating holder (100) as well as by the electrically conductive molded conductor (139) made of a composite material so that a common sheath is formed, wherein the insulating holder (100) and the electrically conductive molded conductor (139) complement one another to form the common sheath.

21. Method according to claim 19, characterized in that the electrically conductive molded conductor (139) is sprayed around surface sections of the connecting conductor (103).

22. Method according to claim 19, characterized in that the electrically conductive conductor (139) is prefabricated of the composite material and is added as such a component to the connecting conductor (103).

23. Method according to claim 19, characterized in that the electrically insulating holder (100) is fabricated by extrusion coating of at least the one connecting conductor (103) and subsequent solidification.

24. Method according to claim 23, characterized in that on its outer side the holder (100) supports at least one slip ring (79), which electrically contacts the connecting conductor (103).

25. Method according to claim 23, characterized in that when spraying on the holder (100), a longitudinal section of the connecting conductor (103) made of insulating material (101) is left free (recess 144) and an end (115) of the connecting conductor (103) also remains free and is used for connecting to an excitation winding (61).

26. Method according to claim 23, characterized in that the electrically conductive molded conductor (139) made of the composite material is also sprayed on the connecting conductor (103) and at least partially complements a recess (144) of the insulating material (101).

27. Method according to claim 23, characterized in that the electrically conductive molded conductor (139) made of the composite material is sprayed on the connecting conductor (103), wherein this step takes place before spraying the holder (100) on the slips rings (79, 81) and the first connecting conductor (103).

* * * * *